United States Patent [19]

Brantley et al.

[11] Patent Number: 5,516,364

[45] Date of Patent: May 14, 1996

[54] METHOD FOR PRODUCING LOW ABRASION KAOLIN PIGMENT

[75] Inventors: James G. Brantley; Charles D. Anderson, both of Warthen; Shannon S. Anderson, Davisboro; Andrew L. Wilcher, Mitchell; R. Brock McNeely, Davisboro, all of Ga.

[73] Assignee: ECC International Inc., Atlanta, Ga.

[21] Appl. No.: 375,795

[22] Filed: Jan. 20, 1995

[51] Int. Cl.$^6$ ............................ C04B 14/10; C04B 33/04

[52] U.S. Cl. .................. 106/484; 106/416; 106/486; 501/141; 241/23; 241/24.11

[58] Field of Search ................... 501/141, 144, 501/145, 150; 423/328.1; 106/416, 484, 486; 241/23, 24, 29, 14; 209/11

[56] References Cited

U.S. PATENT DOCUMENTS

| | | | |
|---|---|---|---|
| 3,014,836 | 12/1961 | Proctor, Jr. | 106/484 |
| 3,326,705 | 6/1967 | Duke | 106/484 |
| 3,586,823 | 6/1971 | Fanselow et al. | 106/416 |
| 3,754,712 | 8/1973 | Cecil | 241/16 |
| 3,808,021 | 4/1974 | Maynard | 106/416 |
| 3,846,147 | 11/1974 | Tapper | 106/416 |
| 3,857,781 | 12/1974 | Maynard | 209/5 |
| 4,017,324 | 4/1977 | Eggers | 106/416 |
| 4,118,245 | 10/1978 | Hamill et al. | 106/416 |
| 4,118,246 | 10/1978 | Horzepa et al. | 106/416 |
| 4,144,084 | 3/1979 | Abercrombie, Jr. | 106/416 |
| 4,144,085 | 3/1979 | Abercrombie, Jr. | 106/416 |
| 4,334,985 | 6/1982 | Turner, Jr. | 209/5 |
| 4,381,948 | 5/1983 | McConnell et al. | 106/416 |
| 4,468,317 | 8/1984 | Turner, Jr. | 209/5 |
| 4,593,860 | 6/1986 | Cook et al. | 241/23 |
| 4,693,427 | 9/1987 | Bilimoria et al. | 241/23 |
| 5,261,956 | 11/1993 | Dunaway et al. | 106/416 |

*Primary Examiner*—Mark L. Bell
*Assistant Examiner*—Michael Marcheschi
*Attorney, Agent, or Firm*—Klauber & Jackson

[57] ABSTRACT

An improvement is disclosed in the method for producing a calcined kaolin clay powder for use in paper manufacture, by the steps of wet beneficiating a kaolin crude, drying the beneficiated crude, milling the dried beneficiated crude to provide a calciner feed, and calcining the feed to destroy the crystallinity thereof and provide an amorphous calcined kaolin powder. According to the improvement, the dried beneficiated crude is milled and classified to provide a calciner feed having substantially no +325 mesh residue, and not greater than 0.0003% by weight +635 mesh residue. This enables lowered abrasion in the calcined powder, and lowered viscocity in the slurried calcined powder product to thereby enable a higher solids slurry.

14 Claims, No Drawings

METHOD FOR PRODUCING LOW ABRASION KAOLIN PIGMENT

BACKGROUND OF THE INVENTION

This invention relates generally to calcined clay products for use in paper manufacture, and more specifically relates to a calcined kaolin clay pigment and method of manufacture of same. The calcined kaolin pigment produced by the method of the invention has an extremely low abrasion, and a low viscosity when prepared as an aqueous product slurry. The latter enables preparation of readily handled and readily used product slurries having very high solids contents.

In the course of manufacturing paper and similar products, including paper board and the like, it is well known to incorporate quantities of inorganic materials into the fibrous web in order to improve the quality of the resulting product. A number of inorganic materials have long been known to be effective for these purposes, such as titanium dioxide, which can be incorporated into the paper in the form of anatase or rutile. Titanium dioxide, however, is among the most expensive materials which are so usable. Accordingly, in recent years, considerable efforts have been made to develop satisfactory replacements for the said titanium dioxide.

Among the materials which have thus found wide acceptance as paper fillers are substantially anhydrous kaolin clays. Materials of this type are generally prepared by partially or fully calcining a crude kaolin clay, which may have been initially subjected to prior beneficiation steps in order to remove certain impurities, e.g. for the purpose of improving brightness in the ultimate product. It is important for an understanding of the present invention, to recognize that those skilled in the art of kaolin processing draw a sharp and fundamental distinction between uncalcined and calcined kaolins. With respect to terminology, it is noted that the prior art literature, including numerous of the prior art patents relating to the field of kaolin products and processing, often uses the term "hydrous" to refer to a kaolin which has not been subjected to calcination—more specifically, which has not been heated to temperatures above about 450° C., which temperatures serve to alter the basic crystal structure of kaolin. These so-called "hydrous" clays may have been produced from crude kaolins, which have been subjected to beneficiation, as, for example, to froth flotation, to magnetic separation, to mechanical delamination, grinding, or similar comminution, but not to the mentioned heating as would impair the crystal structure. In an accurate technical sense, the description of these materials as "hydrous" is, however, incorrect. More specifically, there is no molecular water actually present in the kaolinite structure. Thus, although the composition can be (and often is) arbitrarily written in the form $2H_2O \cdot Al_2O_3 \cdot 2SiO_2$, it is now well-known that kaolinite is an aluminum hydroxide silicate of approximate composition $Al_2(OH)_4Si_2O_5$ (which equates to the hydrated formula just cited). Once the kaolin is subjected to calcination, which, for the purposes of this specification means being subjected to heating of 450° C. or higher for a period which eliminates the hydroxyl groups, the crystalline structure of the kaolinite is destroyed. As used in this specification, the term "calcined kaolin" shall refer to such a kaolin. Preferably the calcined kaolin has been heated above the 980° C. exotherm, and therefore is "fully calcined", as opposed to having been rendered merely a "metakaolin". Reference may be had in the foregoing connection to Proctor, U.S. Pat. Nos. 3,014,836 and to Fanselow et al, 3,586,823, which disclosures are representative of portions of the prior art pertinent to fully calcined kaolins.

A calcined product having characteristics generally superior to previously available such calcined kaolin pigments, is the ALPHATEX® product of ECC International Inc., assignee of the present application. This product again is a substantially anhydrous white kaolin clay pigment, which has unusual efficacy as a filler in paper sheets and similar paper products. The pigment also has application as a coating pigment for paper, and as a pigment in paints and other filled systems. It generally consists of aggregates of anhydrous kaolin clay particles, and exhibits exceptionally high light-scatter and opacifying characteristics when incorporated as a filler in paper. ALPHATEX® is further described in U.S. Pat. No. 4,381,948 to A. D. McConnell et al, as being an anhydrous white kaolin clay pigment having high light scattering when incorporated as a filler in paper, the pigment consisting of porous aggregates from submicron sized kaolin clay platelets obtained by classification of a dispersed kaolin clay to a 100% less than one micron ESD fraction, the aggregates having an average specific gravity in the range of 0.5 to 0.6 and a mean internal pore size of less than 0.55 microns. The size distribution of the aggregates is such that no more than 5% by weight thereof are greater than 10 microns ESD, at least 75% are of less than 2 microns ESD, and not more than 15% by weight are of less than 1 micron ESD. The pigment has a Valley abrasion value below 30 mg., and a G.E. brightness of at least 93. (Brightnesses are measured herein utilizing TAPPI procedure T-646-os-75.) It may be noted that the older Valley abrasion test has generally been superseded in the kaolin industry by procedures which determine so-called Einleiner Abrasion. The general procedures used in measuring Einleiner Abrasion are discussed in U.S. Pat. No. 5,011,534. In the procedure used in McConnell et al. (and more generally in the commercial preparation of calcined kaolins), the crude kaolin is subjected to a wet beneficiation process, after which it is dried, most commonly by spray drying. The dried clay is then pulverized to break up agglomerates and provide a calciner feed. The pulverization is commonly carried out in a hammer mill, various types of which are known in the art. Among the mills that have been widely used commercially for these purposes is the well known Bauer mill. Typically these types of mills will act upon the spray dried kaolin to provide a calciner feed wherein 100% by weight of the pulverized product is less than 325 mesh (44 micrometers).

Following calcination, calcined kaolin clay products such as ALPHATEX® are normally pulverized in a high energy impact mill and air-classified for the purpose of removing as much as possible of +325 mesh residue (to conform to specification for intended use in paper), or in order to remove larger abrasive particles. In order to increase the bulk density and the wet-out characteristics of such products—thereby to facilitate bulk handling-it is also disclosed in U.S. Pat. Nos. 4,593,860 and 4,693,427, that the anhydrous calcined kaolin clay powder can also be dry milled in a media mill (sometimes referred to as a "horizontal mill"), using work inputs of from about 5 to about 40 hp-hr/ton of dry clay.

Calcined kaolin clay products are often handled, shipped and/or utilized (e.g. when coating papers) as aqueous slurries, i.e., the calcined kaolin clay is slurried in water to form a slurry, e.g., of approximately 40% to 60% solids content, more or less. It is desired that the slurry not be unduly viscous since the more viscous the product generally the more difficult it is to handle and to use; but in the past this has proved to be a most vexatious problem, particularly where the solids content of the slurry begins to exceed about 50%.

A large number of prior art patents are concerned with the general problem of reducing clay viscosity, such as Duke U.S. Pat. Nos. 3,326,705; Tuner U.S. Pat. Nos. 4,334,985 and 4,468,317; Maynard U.S. Pat. Nos. 3,808,021 and 3,857,781; and Abercrombie, Jr. U.S. Pat. Nos. 4,144,084 and 4,144,085. These teachings, however, are applicable to hydrous clays, and commonly involve chemical control by additives or elimination of a species tending to cause viscosity problems. The prior art bearing upon viscosity control in calcined clay slurries is more limited, but often involves some type of milling or comminution of the calcined material.

According to Cecil, U.S. Pat. No. 3,754,712, for example, a fluid suspension or slurry of calcined kaolin clay is wet milled in the presence of grinding media, with incremental additions of calcined kaolin clay being added and wet milling continued until the viscosity of the slurry is reduced. Also of interest in this connection are Horzepa et al, U.S. Pat. No. 4,118,246; and Hamill et. al U.S. Pat. No. 4,118, 245. The latter mentions the use of energy inputs of 200 hp-hr/ton; but both of these references concern wet milling, a procedure which is very difficult from an engineering viewpoint, requiring very complex and sophisticated controls. While more applicable to chemical stabilization of calcined clay slurries, reference may also be had to Tapper U.S. Pat. No. 3,846,147; and Eggeers U.S. Pat. No. 4,017,324.

While the foregoing teachings are of value, it is desirable to be able to reduce the viscosity of slurries of calcined clay, without adding special chemical agents to the slurry, and without the use of the prolonged and complex processing inherent in the wet grinding methods of teachings such as Cecil, Hamill et al, Horzepa et al, etc.

Dry grinding of calcined kaolins, as mentioned, is taught in the present assignee's U.S. Pat. No. Nos. 4,593,860 and 4,693,427. Also a broad teaching of frictionally working or milling a calcined kaolin to decrease its clay-water viscosity and adhesive demand, appears in Proctor, Jr., U.S. Pat. No. 3,014,836, where, however, wet milling is disclosed as the preferred and exemplified technique. None of this prior art, however, has disclosed how dry milling may be effectively utilized to produce a superior coating pigment.

More generally, calcined kaolin clay pigments such as the above described ALPHATEX®, have been of increasing interest to paper manufacturers for use in paper coating. In common paper coating applications, the pigment properties sought often include high gloss, good printability, good opacity and high brightness. Where calcined kaolins are used, manufacturers would prefer to utilize a paper coating composition (the "coating color") which desirably incorporates from 15 to 20 parts per hundred (by weight) of the calcined kaolin—this in place of more expensive pigments used in the past, such as titanium dioxide. Overall, the coating color in order to be most effective should include about 60 to 63% by weight of total solids. With most prior art calcined pigments, all of these requirements could not be readily achieved. In particular, in order to achieve the mentioned parts of calcined kaolin in the 60 to 63% solids coating color, it is necessary to be able to use or handle the kaolin pigment at its equivalent of 60% solids; so that the overall requirement is that the kaolin pigment has good rheological properties as a 60% solids aqueous slurry—and also provide fully acceptable opacity, gloss, brightness, printability, etc. when coated. The prior art such pigments, while capable of being formed into such high solids slurries, tended to provide under such conditions very high dilatancy, and thus poor theological properties. In an effort to allow the prior art calcined pigments to be used, lower solids can be employed, but this tends to leave excess water in the coating color —with resultant running during coating.

A further property of many prior art calcined pigments that diminished the value of same as coating pigments, arose from the very porous highly aggregated nature of the component structures of same. While these properties foster high opacity, i.e., good light scattering, they have a detrimental effect on gloss when the pigment is used in coating.

In commonly assigned U.S. Pat. No. 5,261,956, a method is disclosed for preparing a calcined kaolin clay pigment having excellent high shear rheology when formed into high solids aqueous slurries, thereby rendering the materials particularly useful in the coating of paper and paperboard products. The resulting product provides high gloss, high brightness, and good opacity and printability in the papers to which it is applied. In accordance with the method, a kaolin clay powder of fine particle size is calcined at a sufficient temperature and for a sufficient period to destroy the crystallinity of same and render the powder substantially amorphous. The resulting calcined product is then dry milled in a media mill using a work input of from about 100 to 160 hp-hr/ton of dry clay. The product from the dry milling is preferably then pulverized to eliminate undesirable larger particles, usually particles of over 325 mesh. The work input during the pulverization step is preferably at least 30 hp-hr/ton of dry clay, and preferably 50 to 75 hp-hr/ton of dry clay. The dry milling step is preferably carried out in a horizontal (ball) mill and the pulverizing following milling may be effected in a high energy impact mill. The resulting product is substantially that which is available commercially from the present assignee under the trademark DELTATEX®

The use of the high energy horizontal dry media milling effects reduction among the long chain aggregates which typically are found in products such as the aforementioned ALPHATEX®. The resulting product is found to display reduced porosity and reduced light scatter as compared to products like ALPHATEX®, but these properties are not impaired to a degree as to adversely affect the coating properties of a coating composition formed from or including the product of the invention. However, the brightness characteristics of the calcined material are fully retained, and importantly, the glossing characteristics are materially increased by the process of the invention. Also importantly, the viscosity characteristics, specifically the high shear rheology, are improved, i.e., the fluidity of high solids aqueous suspensions incorporating the new materials are significantly better than suspensions of prior art calcined pigments such as ALPHATEX®, thereby enabling coating of paper or paperboard products to be achieved with a new degree of efficiency. In particular, such aspects as runability of a coating color are found to be improved when prepared using the products of the invention. The improvements in viscosity characteristics result in reduced dilatancy, which also means that high solids aqueous suspensions of the said pigments, including typically up to 60%, and to even as high as 64% solids may be easily handled and shipped, and thus readily transferred from a shipping container to the point of use.

Despite the excellent rheology of the calcined product yielded by practice of the invention of the aforementioned U.S. Pat. No. 5,261,956, it would be desirable to further reduce the abrasion of said product in order to even better meet the increasingly stringent requirements of modern paper manufacture. Such an objective is of equal interest in the instance of the product described in the aforementioned U.S. Pat. No. 4,381,948. Additionally it would be desirable to be able to produce a product having excellent rheology as disclosed in U.S. Pat. No. 5,261,956, but without the necessary use of extensive post calcination processing in media mills. Indeed, despite such extensive media milling, and of further pulverization in a Bauer mill, a tendency still exists for an undesirably high +325 mesh residue to remain, which it would be most desirable to reduce since such residue can be a problem to the paper maker. A corresponding tendency to an elevated +325 residue is also observed in the final calcined product from the process of the U.S. Pat. No. 4,381,948 patent, where a lower degree of media milling is also followed by pulverization of the calcined product in a Bauer mill.

OBJECTS OF THE INVENTION

Pursuant to the foregoing, it may be regarded as an object of the present invention, to provide a process for preparing a calcined kaolin clay pigment, as to provide a product which is highly useful in paper coating and filling applications.

It is a further object of the invention, to provide a process of the foregoing character, which enables production of a calcined kaolin clay having extremely low abrasion, which process may be readily carried out by us of comparatively simple equipment, and with relatively simple engineering requirements.

A still further object of the invention, is to provide a calcined kaolin powder, which displays good rheology in very high solids aqueous slurries, thereby facilitating both shipment and handling of same, and its use in coating and in the preparation of coating colors, and which provides high gloss, high brightness, and good opacity and printability characteristics in the papers upon which it is applied.

SUMMARY OF THE INVENTION

Now in accordance with the present invention, the foregoing objects, and others as will become apparent in the course of the ensuing specification, are achieved in an improvement applicable to the method of producing a calcined kaolin clay powder for use in paper manufacture, which method includes the steps of wet beneficiating a kaolin crude, drying the beneficiated crude, milling the dried beneficiated crude to provide a calciner feed, and calcining the feed to destroy the crystallinity thereof and provide an amorphous calcined kaolin powder. The improvement enables lowered abrasion in the calcined powder, and lowered viscosity in the slurried calcined powder product to thereby enable a higher solids slurry. Pursuant to the invention the dried beneficiated crude in the foregoing process is milled and classified to provide a calciner feed having substantially no +325 mesh residue, and not greater than 0.0003% by weight +635 mesh residue. The milling and classifying is preferably effected by passing the dried beneficiated crude through an air classifying mill which contains an impact rotor for attriting said beneficiated crude and an integral vane rotor classifier for classifying the attrited material and recycling oversized particles. The impact rotor is preferably provided with bars at which the dried beneficiated crude is impacted. Oversized rejects from the air classifier mill may be separated in a cyclone separator, and returned to the air classifier mill for further milling.

Calcining pursuant to the invention is preferably carried out at temperatures in the range of 1900° to 2000° F., in order to assure achieving a brightness of 92.5±0.5. In general, however, lowering of the calcining temperatures as compared to prior processes, is possible (e.g. to below 1900° F.) because the extremely fine milling brightens the calciner feed to a point where lower temperatures in the calciner still produce a product of acceptably high brightness. The fineness of the calciner feed produced by the invention provides a significant reduction in calcined product abrasion, even where the calcining temperatures of the prior art are used. However, the ability to successfully use even lower temperatures can produce an even less abrasive product. The fully calcined products of the invention have an einleiner abrasion of less than 5.

In a further aspect of the invention, the calcined amorphous kaolin product is milled in a further air classifying mill, to reduce the +325 residue in the said product to substantially zero (less than 0.0010%). The air classifying mill contains an impact rotor for attriting said calcined product and an integral vane rotor classifier for classifying the attrited material and recycling oversized particles, and the impact rotor is preferably provided with bars at which the calcined product is impacted. The air classifying mill may be in series with a cyclone separator which acts upon the mill output to recycle oversized particles back to the mill for further processing. Also, when a particularly high quality product is required, the air classifying mill may be preceded by a media mill, which, however, is operated as to provide energy input to the calcined product at levels as in the U.S. Pat. No. 4,381,948, not of the intensity called for in U.S. Pat. No. 5,261,956.

Detailed Description of the Preferred Embodiments

Up to the point where the beneficiated crude kaolin is dried in the course of providing a feed for calcining, the process of the invention is generally similar to that of the aforementioned U.S. Pat. Nos. 4,381,948 and 5,261,956. A further procedure suitable for use in preparing the dried kaolin is described in Fanselow et al U.S. Pat. No. 3,586,523. Typically the crude kaolin is blunged and dispersed to form an aqueous dispersion of same, which is subjected to a particle size separation to recover a fine particle size slurry. If desired, additional beneficiation steps can also be used, such as froth flotation and high intensity magnetic separation, such techniques being well known and exemplified in the prior art. The slurry of the beneficiated kaolin is then dried to produce a substantially moisture-free clay, typically by being subjected to conventional spray drying. Conventionally this spray dried product is then subjected to pulverization in a hammer mill such as a Bauer mill, to provide the feed for calcination. Pursuant to the invention, however, the spray (or otherwise) dried kaolin is subjected to an extremely thorough milling and classification, which is preferably carried out in an air classifying mill. The latter, in order to enable high volume output of the desired fine particle size product, can be in series with a cyclone separator which provides feedback of oversized particles to the mill. When the dried kaolin is milled in the manner indicated, and as is also the case in the prior art, substantially no +325 mesh particles remain in the calciner feed. However a vast change occurs with respect to the +635 mesh residue, i.e. there is a reduction which typically runs around 80% in the population of particles having an E.S.D of 20 μm or more. This change in the over 20 μm particle content of the calciner feed is found to have an unexpected effect upon the abrasion in the final calcined product, leading to a remarkable reduction in same, without in any way adversely affecting the optical properties of the product or the optical and/or printing qualities of paper in which the product is incorporated.

The air classifying mill utilized in the invention may be of the type exemplified by the Mikro-ACM pulverizer. A general form of this type of mill is described inter alia in *Perry's Chemical Engineer's Handbook*, 6th Ed. McGraw-Hill, N.Y. 1984, at page 8–42, as a pin mill with the feed being carried through the rotating pins and recycled through an attached vane classifier. Feed is advanced to the mill by a screw conveyer and first impacts at the pins of the pin rotor. Particles are entrained by an air stream which enters below the pin rotor and are carried up between the inner wall and the shroud ring with baffles which decrease air swirl. Particles are then deflected inward by an air-dispersing ring to a vane rotor classifier. The rotor is separately driven through a speed control which may be adjusted independently of the pin rotor speed. Acceptable particles pass upward through the exhaust and to a collector. Oversize particles are carried downward by the internal circulating air stream and are returned to the pin rotor for a further reduction. It is preferable in the invention to utilize instead of pins, bars which are generally formed as flattened planar elements, the long lateral knife-like edges of which are oriented toward the rotor periphery so that the feed from the screw conveyer will impact against such edges.

The invention will now be illustrated by specific Examples, which should, however, be considered exemplary only of the invention, and not delimitative of the characteristics otherwise set forth.

EXAMPLE 1

In this Example the spray dried beneficiated kaolin crude was subjected to fine milling and classifying in an air classifying mill of the type discussed above, except that the actual mill used was the CMT mill produced by Powder Process Systems, Inc. of Shoeburyness, England. This mill had a power input of 375 HP to its drive motor, and was run to process 11 tons per hour of the spray dried material. As a control an identical spray dried material was milled according to the prior art—in a series of three Bauer mills in which the material was processed at the practical limit (for such mills) of 8 tons per hour. Each of the Bauer mills was driven by a 125 HP motor, whereby corresponding power was used in both arrangements, although considerably less energy per ton of kaolin was used in the configuration of the invention. Brightness of the material (Sample A) milled in the CMT mill was estimated to be at least 0.5 units higher than the 80.2 measured for the conventional Bauer milled material (Control Sample 1). The actual brightness of the CMT milled feed samples were not measured. However, the effects of using very extensive milling to severely reduce +635 mesh residue was simulated by subjecting samples of the spray dried material to 2 to 4 passes through a laboratory Mikropul Bantam pulverizer. A double pass reduced the +635 residue to 0.001% and provided a 0.2 increase in brightness; at four passes, the residue was 0.0008% and brightness was increased by 0.6 units. The greater brightness of Sample A is believed a result of its generally finer particle size. 325 mesh residue was substantially zero for both products. However, in the instance of +635 mesh residue the control sample included 0.0030 to 0.0040% by weight; while Sample A, processed as in the invention, had a mere 0.0005 to 0.0004% by weight of +635 mesh residue.

Both control sample 1 and Sample A were then calcined for identical times at 1975° F. Following calcining, the control product was subjected to about 40 HP per hour of milling in a media mill as is normally employed in producing ALPHATEX® in order to provide acceptable viscosity in a slurry of such material, and the thus milled material was then further pulverized in a Bauer mill. In contrast the Sample A required no media milling, and was simply pulverized directly in the Bauer mill. Einleiner Abrasion and brightness were measured for the Samples and the viscosity of a 50% solids slurry of calcined Sample A was determined. The data measured and obtained overall in this Example is set forth in Table I:

TABLE I

|  | Sample A | Control Sample 1 |
|---|---|---|
| Feed Rate | 11 tph | 8 tph |
| Milled Brightness | estimated to be at least 0.5 > sample 1 | 80.2 |
| Calcining Temperature | 1975° F. | 1975° F. |
| Calcined Brightness | 92.7 | 92.8 |
| Einleiner Abrasion* | 4.6 | 6.8 |
| Brookfield Viscosity | 20 cps @ 50% solids | |
| High Shear Viscosity | 1180 rpm @ 18 dynes | |

*43,500 revolutions

EXAMPLE 2

The procedure of Example 1 was repeated, except in this instance the control Sample 2 was processed as in U.S. Pat. No. 5,261,956; i.e., so as to be provided with a higher degree of media milling following calcination, in order to provide very low viscosity in high solids slurries of the calcined powder. The resulting product was the equivalent of the assignee's DELTATEX® product. It was found that the sample B processed following spray drying as was Sample A in Example 1, provided in all respects a final calcined product which was superior to control Sample 2, and that (unlike the extensive media milling needed in the procedure of U.S. Pat. No. 5,261,956) only 40 HP per hour ton of media milling was needed in order to provide the outstanding viscosities for Sample B slurries as are otherwise achieved in the said patent. These results are seen in Table II:

TABLE II

|  | Sample B | Control Sample 2 |
|---|---|---|
| Feed Rate | 11 tph | 8 tph |
| Calcining Temperature | 1975° F. | 1975° F. |
| Calcined Brightness | 92.4 | 92.9 |
| Einleiner Abrasion* | 3.6 | 6.7 |
| Brookfield Viscosity | 120 cps @ 59.9% solids | |
| High Shear Viscosity | 410 rpm @ 18 dynes | 625 r.p.m. @ 18 dynes @ 59% solids |

*43,500 revolutions

EXAMPLE 3

A portion of the Control Sample in Example 1 following calcining, was horizontal milled at 40 HP-hr/ton, and then pulverized in a Bauer mill. This is in accordance with the conventional practice, e.g. in producing the aforementioned ALPHATEX®. A portion of Sample A following calcining, without being horizontally milled, was subjected to milling and air classifying in a further air classifying mill of the same type as used in premilling the beneficiated crude kaolin in Example 1. The resulting products were then evaluated for undesirable +325 mesh residue (and for brightness). The product resulting from the control sample had a brightness of 92.8 and a residue of 0.0042%. The product resulting from Sample A had a brightness of 92.9 and a residue of 0.0004%, which represents a 90% reduction in 325 mesh residue.

EXAMPLE 4

A portion of the Control Sample in Example 2 following calcining, was horizontal milled at 160 HP-hr/ton, and then pulverized in a Bauer mill. This is in accordance with the conventional practice, e.g. in producing the DELTATEX® product of U.S. Pat. No. 5,261,956. A portion of Sample B following calcining, was horizontally milled at an intensity of 40 HP-hr/ton and was subjected to milling and air classifying in a further air classifying mill of the same type as used in premilling the beneficiated crude kaolin in Example 2. The resulting products were then evaluated for undesirable +325 mesh residue (and for brightness). The product resulting from the control sample had a brightness of 92.9 and a residue of 0.0054%. The product resulting from Sample B had a brightness of 92.7 and a residue of 0.0003%, which represents a 94% reduction in 325 mesh residue.

EXAMPLE 5

Portions of Sample A and Control Sample 1 were evaluated in 60 gsm handsheets. The samples were evaluated in a pulp finish consisting of 60% HW/40% SW beaten to a 353 CFS. Percol 292, a cationic polyacrylamide, was added as a retention aid. Sheet properties interpolated for a 10% filler level are shown in Table III and establish that the products yielded by the invention provide sheet properties as good or better than the products prepared by the prior art processes.

TABLE III

| Filler | Sheet Brightness | Sheet Scatter | Printing Opacity | Bulk |
|---|---|---|---|---|
| Unfilled | 79.5 | 299 | 71.5 | 1.73 |
| Control 1 | 85.7 | 653 | 84.2 | 1.79 |
| Sample A | 85.6 | 659 | 84.4 | 1.86 |

EXAMPLE 6

In this Example calcined samples A and B were compared to Control Samples 1 and 2 in a coating application to compare opacity, pore volume, and light scatter. Pigments used:

| |
|---|
| #1 85 Parts Astra Plate ®*/15 Parts Control Sample 1 |
| #2 85 Parts Astra-Plate ®/15 Parts Control Sample 2 |
| #3 85 Parts Astra-Plate ®/15 Parts Sample A |
| #4 85 Parts Astra-Plate ®/15 Parts Sample B |

| Formulation: | |
|---|---|
| 8 Parts | Dow 620 |
| 8 Parts | PG 280 |
| 0.5 Part | Nopcote C-104 |
| 0.25 Part | Sunrez 700M |
| 0.1 Part | Dispex N-40 |

*Astra-Plate ® is a No. 2 coating clay produced by the assignee, having 80–88% by weight <2 μm ESD, and a G. E. brightness of 87.5 to 89.0.

pH adjusted to 8.0 with $NH_4OH$. Test results are seen in Table IV below. It will be evident that significant improvements in sheet brightness are achieved where the pigments produced by use of the invention are employed.

TABLE IV

| Coated Sheet Properties (Interpolated @ 8 g/m$^2$) | | | | |
|---|---|---|---|---|
| Calendering Conditions: | | | | |
| Calender | B. F. Perkins Supercalender | | | |
| Temperature | 150° F. | | | |
| Pressure | 1000 psi | | | |
| Passes thru Nip | 2 | | | |
| Calender Speed | 50 | | | |
| Pigments: | | | | |
| Coating # | #1 | #2 | #3 | #4 |
| Coating Wt., g/m$^2$ | 8.0 | 8.0 | 8.0 | 8.0 |
| Brightness, ISO L = | 73.2 | 73.7 | 74.3 | 73.8 |
| Hunter L L = | 89.29 | 89.44 | 89.61 | 89.44 |
| Hunter a L = | 0.28 | 0.20 | 0.20 | 0.17 |
| Hunter b L = | 5.88 | 5.69 | 5.48 | 5.67 |
| Opacity, ISO L = | 93.7 | 93.5 | 93.4 | 93.2 |
| Parker Print-Surf S.10 kgf/cm$^2$ Roughness, Micron L = | 1.26 | 1.26 | 1.26 | 1.32 |
| Sheet Gloss L = | 52.6 | 52.4 | 51.4 | 50.8 |
| (75°) Q = | 54.6 | 53.4 | 52.8 | 53.5 |
| Print Gloss L = | 61.0 | 61.8 | 59.4 | 59.4 |
| (75°) Q = | 61.3 | 62.2 | 60.1 | 62.1 |
| Delta Print L = | 8.4 | 9.4 | 8.0 | 8.6 |
| Gloss* Q = | 6.8 | 8.8 | 7.3 | 8.6 |
| Dry Pick, L = VVP | 44.7 | 42.4 | 40.0 | 41.2 |

L = Linear
Q = Quadratic
*Data Calculated Using Interpolated Values

While the present invention has been particularly set forth in terms of specific embodiments thereof, it will be understood in view of the instant disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

What is claimed is:

1. In the method for producing a calcined kaolin clay powder for use in paper manufacture, by the steps of wet beneficiating a kaolin crude, drying the beneficiated crude, milling the dried beneficiated crude to provide a calciner feed, and calcining the feed to destroy the crystallinity thereof and provide an amorphous calcined kaolin powder; the improvement which enables lowered abrasion in the calcined powder, and lowered viscocity in the slurried calcined powder product to thereby enable a higher solids slurry; comprising:

milling and classifying the dried beneficiated crude to provide a calciner feed having substantially no +325 mesh residue, and not greater than 0.0003% by weight +635 mesh residue.

2. A method in accordance with claim 1, wherein said milling and classifying is accomplished by passing the dried beneficiated crude through an air classifying mill.

3. A method in accordance with claim 2, wherein said air classifying mill contains an impact rotor for attriting said beneficiated crude and an integral vane rotor classifier for classifying the attrited material and recycling oversized particles.

4. A method in accordance with claim 3, wherein said impact rotor has bars for impacting the dried beneficiated crude.

5. A method in accordance with claim 2, further including separating oversized rejects from said air classifier mill in a cyclone separator, and returning said oversized rejects to said air classifier mill for further milling.

6. A method in accordance with claim 1, wherein said calcining is carried out at temperatures in the range of 1900° to 2000° F. to provide a brightness of 92.5±0.5.

7. A method in accordance with claim 1, wherein said calcining is carried out at temperatures of 1900° F. or less.

8. A method in accordance with claim 1, further including milling the calcined amorphous kaolin product in a further air classifying mill, to reduce the +325 residue in the said product to less than 0.0010%.

9. A method in accordance with claim 8, wherein said air classifying mill contains an impact rotor for attriting said calcined product and an integral vane rotor classifier for classifying the attrited material and recycling oversized particles.

10. A method in accordance with claim 9, wherein said impact rotor is provided with bars at which the calcined product is impacted.

11. A method in accordance with claim 8, wherein said calcining is carried out at temperatures in the range of 1900° to 2000° F.

12. A calcined kaolin clay powder produced by the process of claim 1.

13. A calcined kaolin clay powder produced by the process of claim 6.

14. A fully calcined kaolin clay powder having an einleiner abrasion of less than 5, a G.E. brightness of 92.5±0.5, and a +325 residue of less than 0.0010%.

* * * * *